US012733753B2

(12) United States Patent
Ewing et al.

(10) Patent No.: US 12,733,753 B2
(45) **Date of Patent: *Sep. 15, 2026**

(54) ANTI-THEFT PUSHER WITH INCREMENTAL DISTANCE DETECTION

(71) Applicant: Fasteners for Retail, Inc., Twinsburg, OH (US)

(72) Inventors: Brent O. Ewing, Roscoe, IL (US); Chan Chor Man, Tai Po N.T. (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/907,795

(22) Filed: Oct. 7, 2024

(65) Prior Publication Data

US 2025/0031873 A1 Jan. 30, 2025

Related U.S. Application Data

(63) Continuation of application No. 18/326,127, filed on May 31, 2023, now Pat. No. 12,137,819, which is a (Continued)

(51) Int. Cl.

| | |
|---|---|
| ***A47F 1/12*** | (2006.01) |
| ***G07F 9/02*** | (2006.01) |
| ***G08B 21/18*** | (2006.01) |

(52) U.S. Cl.

CPC ................ *A47F 1/126* (2013.01); *G07F 9/02* (2013.01); *G08B 21/182* (2013.01)

(58) Field of Classification Search

CPC .......... A47F 1/126; G07F 9/02; G08B 21/182

(Continued)

(56) References Cited

U.S. PATENT DOCUMENTS

| | | | |
|---|---|---|---|
| 1,922,989 | A | 8/1933 | Terry |
| 2,358,658 | A | 9/1944 | Riche et al. |

(Continued)

FOREIGN PATENT DOCUMENTS

| | | | |
|---|---|---|---|
| CA | 3054574 | A1 | 8/2018 |
| CN | 1276769 | A | 12/2000 |

(Continued)

OTHER PUBLICATIONS

POS Tuning—für mehr Erfolg am Point of Sale: POS T-Product Pusher; http://www.postuning.de/69.0.html?&L=2; website; Mar. 29, 2006; 1 page.

(Continued)

*Primary Examiner* — Zhen Y Wu

(74) *Attorney, Agent, or Firm* — Reinhart Boerner Van Deuren P.C.

(57) ABSTRACT

A retail merchandise pusher is configured for sliding along a pusher assembly track. The pusher assembly is mountable to a retail merchandise shelf. The pusher includes a housing, a spring drum rotatably mounted within the housing, and a coil spring mounted to the spring drum. The coil spring is coilable and uncoilable upon rotation of the spring drum. A controller is coupled to a sensor arrangement within the housing. The sensor arrangement has a spring drum sensor for detecting rotation of the spring drum. A direction sensor detects a direction of rotation of the spring drum. An incremental distance sensor detects incremental movement of the pusher. The controller is configured to calculate, based on data from the sensor arrangement, a total distance and direction of travel by the pusher, and to generate an alarm when the pusher travels more than a threshold distance within a predetermined period of time.

20 Claims, 9 Drawing Sheets

Related U.S. Application Data continuation of application No. 17/727,496, filed on Apr. 22, 2022, now Pat. No. 11,707,141, which is a continuation of application No. 16/839,667, filed on Apr. 3, 2020, now Pat. No. 11,363,894.

(60) Provisional application No. 62/830,045, filed on Apr. 5, 2019.

(58) Field of Classification Search
USPC .............................................................. 211/4
See application file for complete search history.

(56) References Cited

U.S. PATENT DOCUMENTS

| | | | | |
|---|---|---|---|---|
| 2,398,411 | A | 4/1946 | Cook | |
| 2,954,128 | A | 9/1960 | Gordon | |
| 2,996,593 | A | 8/1961 | McMains | |
| 3,248,005 | A | 4/1966 | Joschko | |
| 3,550,121 | A | 12/1970 | Porter, Jr. | |
| 3,572,546 | A | 3/1971 | Schlaf | |
| 3,706,309 | A | 12/1972 | Toftness | |
| 3,773,217 | A | 11/1973 | Schlaf | |
| 3,848,745 | A | 11/1974 | Smith | |
| 3,852,735 | A | 12/1974 | Matsuda et al. | |
| 3,983,341 | A | 9/1976 | Stanish | |
| 4,001,805 | A | 1/1977 | Golbe | |
| 4,020,305 | A | 4/1977 | Schwartz | |
| 4,021,796 | A | 5/1977 | Fawcett, Jr. et al. | |
| 4,122,437 | A | 10/1978 | Petersen | |
| 4,166,273 | A | 8/1979 | Riley, Jr. et al. | |
| 4,227,188 | A | 10/1980 | Petersen | |
| 4,269,025 | A | 5/1981 | Kondo | |
| 4,289,242 | A | 9/1981 | Kenyon | |
| 4,311,889 | A | 1/1982 | Blanchard et al. | |
| 4,312,460 | A | 1/1982 | Boettcher | |
| 4,352,170 | A | 9/1982 | Jetter | |
| 4,352,171 | A | 9/1982 | Jetter | |
| 4,370,069 | A | 1/1983 | Nomura | |
| 4,383,242 | A | 5/1983 | Sassover et al. | |
| 4,384,906 | A | 5/1983 | Molinari et al. | |
| 4,462,023 | A | 7/1984 | Nielsen et al. | |
| 4,470,236 | A | 9/1984 | MacDonald, Jr. | |
| 4,475,658 | A | 10/1984 | Roberts | |
| 4,566,598 | A | 1/1986 | Fors | |
| 4,600,119 | A | 7/1986 | Olson | |
| 4,638,922 | A | 1/1987 | Stoltz | |
| 4,675,654 | A | 6/1987 | Copeland | |
| 4,688,025 | A * | 8/1987 | Frank | G08B 13/02 340/689 |
| 4,706,821 | A | 11/1987 | Kohls et al. | |
| 4,712,694 | A | 12/1987 | Breslow | |
| 4,718,626 | A | 1/1988 | Thalenfeld et al. | |
| 4,742,923 | A | 5/1988 | Calvert | |
| 4,821,894 | A | 4/1989 | Dechirot | |
| D300,994 | S | 5/1989 | Wolff | |
| 4,830,201 | A | 5/1989 | Breslow | |
| 4,836,390 | A | 6/1989 | Polvere | |
| 4,870,228 | A | 9/1989 | Speer et al. | |
| 4,887,737 | A | 12/1989 | Adenau | |
| 4,899,668 | A | 2/1990 | Valiulis | |
| 4,901,869 | A | 2/1990 | Hawkinson et al. | |
| 4,942,386 | A | 7/1990 | Willis | |
| 4,944,414 | A | 7/1990 | Albright | |
| 4,962,367 | A | 10/1990 | Tymn | |
| 4,967,044 | A | 10/1990 | Speer et al. | |
| 4,996,515 | A | 2/1991 | Schaffer et al. | |
| 5,009,334 | A | 4/1991 | Bodkins | |
| 5,068,643 | A | 11/1991 | Yashina | |
| 5,070,986 | A | 12/1991 | Hoffman et al. | |
| 5,083,638 | A | 1/1992 | Schneider | |
| 5,086,641 | A | 2/1992 | Roselli | |
| 5,114,021 | A | 5/1992 | Fredrickson | |
| 5,161,704 | A | 11/1992 | Valiulis | |
| 5,168,263 | A | 12/1992 | Drucker | |
| 5,222,608 | A | 6/1993 | Eklof et al. | |
| 5,240,126 | A | 8/1993 | Foster et al. | |
| 5,255,182 | A | 10/1993 | Adams | |
| 5,265,738 | A | 11/1993 | Yablans et al. | |
| 5,307,941 | A | 5/1994 | Siegal | |
| 5,317,304 | A | 5/1994 | Choi | |
| 5,335,892 | A | 8/1994 | Busch | |
| 5,397,856 | A | 3/1995 | Lee | |
| 5,434,559 | A | 7/1995 | Smiley et al. | |
| 5,469,135 | A | 11/1995 | Solow | |
| 5,570,080 | A | 10/1996 | Inoue et al. | |
| 5,610,337 | A | 3/1997 | Nelson | |
| 5,641,077 | A | 6/1997 | Tufano et al. | |
| 5,649,641 | A | 7/1997 | Campoli | |
| 5,671,851 | A | 9/1997 | Johnson et al. | |
| 5,685,664 | A | 11/1997 | Parham et al. | |
| 5,690,238 | A | 11/1997 | Schmehr | |
| 5,730,320 | A | 3/1998 | David | |
| 5,748,082 | A | 5/1998 | Payne | |
| 5,757,270 | A | 5/1998 | Mori | |
| 5,815,066 | A | 9/1998 | Pumilia | |
| 5,838,225 | A | 11/1998 | Todd | |
| 5,839,588 | A | 11/1998 | Hawkinson | |
| 5,855,282 | A | 1/1999 | Hardy | |
| 5,905,438 | A | 5/1999 | Weiss et al. | |
| 5,906,283 | A | 5/1999 | Kump et al. | |
| 5,955,951 | A | 9/1999 | Wischerop et al. | |
| 5,965,954 | A | 10/1999 | Johnson et al. | |
| 5,971,173 | A | 10/1999 | Valiulis et al. | |
| 5,977,654 | A | 11/1999 | Johnson et al. | |
| 5,979,674 | A | 11/1999 | Thalenfeld | |
| 5,995,003 | A | 11/1999 | Rogers | |
| 6,041,720 | A | 3/2000 | Hardy | |
| 6,049,268 | A | 4/2000 | Flick | |
| 6,082,558 | A * | 7/2000 | Battaglia | A47F 1/126 211/59.3 |
| 6,102,192 | A | 8/2000 | Tomuro et al. | |
| 6,105,791 | A | 8/2000 | Chalson et al. | |
| 6,109,458 | A | 8/2000 | Walsh et al. | |
| 6,129,218 | A | 10/2000 | Henry et al. | |
| 6,131,748 | A | 10/2000 | Kawasaki et al. | |
| 6,133,830 | A | 10/2000 | D'Angelo et al. | |
| 6,158,598 | A | 12/2000 | Josefsson | |
| 6,269,285 | B1 | 7/2001 | Mignault | |
| 6,279,256 | B1 | 8/2001 | Norolof et al. | |
| 6,286,690 | B1 | 9/2001 | Thalenfeld | |
| 6,373,381 | B2 | 4/2002 | Wu | |
| 6,409,028 | B2 | 6/2002 | Nickerson | |
| 6,418,797 | B1 | 7/2002 | Ambrosina et al. | |
| 6,474,478 | B1 | 11/2002 | Huehner et al. | |
| 6,517,000 | B1 | 2/2003 | McAllister et al. | |
| D472,331 | S | 3/2003 | Zadak | |
| 6,539,280 | B1 | 3/2003 | Valiulis et al. | |
| 6,628,344 | B1 | 9/2003 | Weber | |
| D480,231 | S | 10/2003 | Valiulis et al. | |
| 6,659,291 | B2 | 12/2003 | Huehner et al. | |
| 6,690,411 | B2 | 2/2004 | Naidoo et al. | |
| 6,769,552 | B1 | 8/2004 | Thalenfeld | |
| 6,820,754 | B2 | 11/2004 | Ondrasik | |
| 6,824,009 | B2 | 11/2004 | Hardy | |
| 6,874,684 | B1 | 4/2005 | Denenberg et al. | |
| 6,886,699 | B2 | 5/2005 | Johnson et al. | |
| 6,889,854 | B2 | 5/2005 | Burke | |
| 6,923,330 | B1 | 8/2005 | Nagel | |
| 6,964,235 | B2 | 11/2005 | Hardy | |
| 6,967,578 | B1 | 11/2005 | Guida | |
| 7,007,810 | B2 | 3/2006 | Huehner et al. | |
| 7,017,778 | B2 | 3/2006 | Halbherr | |
| 7,018,180 | B2 | 3/2006 | Koo | |
| 7,059,518 | B2 | 6/2006 | Forster | |
| 7,137,513 | B2 | 11/2006 | Sedon et al. | |
| 7,174,176 | B1 | 2/2007 | Liu | |
| 7,178,678 | B2 | 2/2007 | Mansfield et al. | |
| 7,202,784 | B1 | 4/2007 | Herwig | |
| 7,210,164 | B1 | 4/2007 | Jandrell | |
| 7,258,461 | B1 | 8/2007 | Izardel | |
| 7,287,669 | B2 | 10/2007 | Takeda | |
| 7,293,663 | B2 | 11/2007 | Lavery, Jr. | |
| 7,347,335 | B2 | 3/2008 | Rankin, VI et al. | |

(56) References Cited

U.S. PATENT DOCUMENTS

| | | | | |
|---|---|---|---|---|
| 7,377,402 | B2 | 5/2008 | Takeda | |
| 7,395,938 | B2 | 7/2008 | Merit et al. | |
| 7,410,034 | B1 | 8/2008 | Wagner et al. | |
| 7,530,188 | B2 | 5/2009 | Beilenhoff et al. | |
| 7,533,784 | B2 | 5/2009 | Vlastakis et al. | |
| 7,559,437 | B2 | 7/2009 | Colelli et al. | |
| 7,566,037 | B2 | 7/2009 | Vogler | |
| 7,584,930 | B2 | 9/2009 | Zich | |
| 7,591,422 | B2 | 9/2009 | Maitin | |
| 7,591,442 | B2 | 9/2009 | Dinh et al. | |
| 7,671,741 | B2 | 3/2010 | Lax et al. | |
| 7,671,742 | B2 | 3/2010 | Fallin et al. | |
| 7,749,121 | B2 | 7/2010 | Perng | |
| 7,768,399 | B2 | 8/2010 | Hachmann et al. | |
| 7,792,711 | B2 | 9/2010 | Swafford, Jr. et al. | |
| 7,828,158 | B2 * | 11/2010 | Colelli | A47F 1/126 211/59.3 |
| 7,905,364 | B2 | 3/2011 | Pail | |
| 7,916,020 | B2 | 3/2011 | Seidel | |
| 7,969,305 | B2 | 6/2011 | Belden, Jr. et al. | |
| 8,016,128 | B2 | 9/2011 | Valiulis et al. | |
| 8,069,994 | B2 | 12/2011 | Barkdoll | |
| 8,103,047 | B1 | 1/2012 | Griess et al. | |
| 8,139,945 | B1 | 3/2012 | Amir et al. | |
| 8,190,289 | B2 * | 5/2012 | Lockwood | G07F 17/10 221/3 |
| 8,215,520 | B2 * | 7/2012 | Miller | A47F 3/002 221/184 |
| 8,240,486 | B2 | 8/2012 | Niederhuefner et al. | |
| 8,260,456 | B2 | 9/2012 | Siegel et al. | |
| 8,274,391 | B2 | 9/2012 | Yang | |
| 8,276,766 | B2 | 10/2012 | Rataiczak, III et al. | |
| 8,328,027 | B2 | 12/2012 | Barkdoll | |
| 8,360,253 | B2 | 1/2013 | Hardy | |
| 8,368,542 | B2 | 2/2013 | Yang | |
| 8,373,564 | B2 | 2/2013 | Wyatt, Jr. et al. | |
| 8,378,826 | B2 | 2/2013 | Mercier et al. | |
| 8,386,075 | B2 * | 2/2013 | Lockwood | G07F 17/10 221/152 |
| 8,443,988 | B2 | 5/2013 | Niederhuefner | |
| 8,496,126 | B2 * | 7/2013 | Mueller | A47F 1/126 211/59.3 |
| 8,523,012 | B2 | 9/2013 | Richardson et al. | |
| 8,534,469 | B2 | 9/2013 | Northrup, Jr. et al. | |
| 8,629,772 | B2 | 1/2014 | Valiulis et al. | |
| 8,684,227 | B2 | 4/2014 | Richardson et al. | |
| 8,720,702 | B2 | 5/2014 | Nagel | |
| 8,803,687 | B2 | 8/2014 | Valiulis et al. | |
| 8,812,378 | B2 * | 8/2014 | Swafford, Jr. | G06Q 10/087 705/28 |
| 8,823,521 | B2 * | 9/2014 | Overhultz | G07F 9/026 340/568.1 |
| 8,884,761 | B2 | 11/2014 | Valiulis | |
| 8,941,495 | B2 * | 1/2015 | Wiese | G08B 13/08 340/568.8 |
| 9,009,773 | B1 | 4/2015 | Hendricks et al. | |
| 9,129,494 | B2 | 9/2015 | Valiulis et al. | |
| 9,167,916 | B2 | 10/2015 | Grant et al. | |
| 9,241,583 | B2 | 1/2016 | Nagel | |
| 9,254,049 | B2 | 2/2016 | Nagel | |
| 9,318,007 | B2 | 4/2016 | Valiulis et al. | |
| 9,318,008 | B2 | 4/2016 | Valiulis et al. | |
| 9,324,220 | B2 | 4/2016 | Valiulis | |
| 9,437,736 | B2 | 9/2016 | Taniguchi et al. | |
| 9,483,896 | B2 | 11/2016 | Lockwood et al. | |
| 9,495,856 | B2 | 11/2016 | Brenner | |
| 9,576,417 | B2 * | 2/2017 | Christianson | G07F 9/026 |
| 9,675,184 | B2 | 6/2017 | Xin | |
| 9,805,334 | B2 | 10/2017 | Overhultz et al. | |
| 9,805,539 | B2 | 10/2017 | Swafford, Jr. et al. | |
| 9,818,081 | B2 | 11/2017 | Khalid et al. | |
| 10,111,540 | B2 | 10/2018 | Brej | |
| 10,121,341 | B2 | 11/2018 | Ewing et al. | |
| 10,219,636 | B2 | 3/2019 | Berglund et al. | |
| 10,219,637 | B2 * | 3/2019 | Åberg | A47F 1/04 |
| 10,271,666 | B2 | 4/2019 | Taylor et al. | |
| 10,357,118 | B2 | 7/2019 | Swafford | |
| 10,535,216 | B2 | 1/2020 | Swafford, Jr. et al. | |
| 10,720,035 | B2 | 7/2020 | Ewing et al. | |
| 10,885,753 | B2 | 1/2021 | Ewing et al. | |
| 10,993,550 | B2 | 5/2021 | Ewing et al. | |
| 11,006,768 | B2 | 5/2021 | Berglund et al. | |
| 11,154,143 | B2 | 10/2021 | Ewing et al. | |
| 11,154,144 | B2 | 10/2021 | Bird et al. | |
| 11,182,738 | B2 * | 11/2021 | Costello | A47F 1/126 |
| 11,317,738 | B2 | 5/2022 | Ewing et al. | |
| 11,363,894 | B2 | 6/2022 | Ewing et al. | |
| 11,403,906 | B2 | 8/2022 | Hua et al. | |
| 11,412,863 | B2 * | 8/2022 | Grant | A47F 3/002 |
| 11,605,276 | B2 | 3/2023 | Ewing et al. | |
| 11,707,141 | B2 | 7/2023 | Ewing et al. | |
| 12,137,819 | B2 | 11/2024 | Ewing et al. | |
| 12,144,438 | B2 | 11/2024 | Ewing et al. | |
| 2001/0002210 | A1 | 5/2001 | Petite | |
| 2001/0004239 | A1 | 6/2001 | Irizarry et al. | |
| 2001/0044751 | A1 | 11/2001 | Pugliese, III et al. | |
| 2002/0004690 | A1 | 1/2002 | Paulucci et al. | |
| 2002/0067259 | A1 | 6/2002 | Fufidio et al. | |
| 2002/0108916 | A1 | 8/2002 | Nickerson | |
| 2002/0130776 | A1 | 9/2002 | Houde | |
| 2002/0188866 | A1 | 12/2002 | Jalaludeen et al. | |
| 2003/0004784 | A1 | 1/2003 | Li et al. | |
| 2003/0029816 | A1 | 2/2003 | Huehner et al. | |
| 2003/0030548 | A1 | 2/2003 | Kovacs et al. | |
| 2003/0057167 | A1 * | 3/2003 | Johnson | A47F 1/126 211/59.3 |
| 2003/0175004 | A1 | 9/2003 | Garito et al. | |
| 2003/0227382 | A1 | 12/2003 | Breed | |
| 2004/0034581 | A1 | 2/2004 | Hill et al. | |
| 2004/0053044 | A1 | 3/2004 | Moreno et al. | |
| 2004/0073334 | A1 | 4/2004 | Terranova | |
| 2004/0084386 | A1 | 5/2004 | Huehner et al. | |
| 2004/0124201 | A1 | 7/2004 | Hieb | |
| 2004/0145477 | A1 | 7/2004 | Easter et al. | |
| 2004/0195319 | A1 | 10/2004 | Forster | |
| 2005/0029283 | A1 | 2/2005 | Pedigo | |
| 2005/0040123 | A1 | 2/2005 | Ali | |
| 2005/0056602 | A1 | 3/2005 | Hardy | |
| 2005/0098626 | A1 | 5/2005 | Jordan et al. | |
| 2005/0104733 | A1 | 5/2005 | Campero | |
| 2005/0161420 | A1 | 7/2005 | Hardy et al. | |
| 2005/0168345 | A1 * | 8/2005 | Swafford | G08B 13/19697 340/686.1 |
| 2005/0189309 | A1 | 9/2005 | Hardy | |
| 2005/0189369 | A1 | 9/2005 | Vlastakis et al. | |
| 2005/0261816 | A1 | 11/2005 | DiCroce et al. | |
| 2005/0279722 | A1 * | 12/2005 | Ali | A47F 10/00 211/59.3 |
| 2005/0288708 | A1 | 12/2005 | Kammerer et al. | |
| 2006/0049122 | A1 | 3/2006 | Mueller et al. | |
| 2006/0068144 | A1 | 3/2006 | Mizuno et al. | |
| 2006/0163180 | A1 | 7/2006 | Rankin, VI et al. | |
| 2006/0163272 | A1 * | 7/2006 | Gamble | A47F 1/126 221/227 |
| 2006/0198611 | A1 | 9/2006 | Park | |
| 2006/0219517 | A1 | 10/2006 | Cheng et al. | |
| 2006/0226095 | A1 | 10/2006 | Hardy | |
| 2006/0240398 | A1 | 10/2006 | Hardy et al. | |
| 2007/0050271 | A1 | 3/2007 | Ufford et al. | |
| 2007/0080123 | A1 | 4/2007 | Mason | |
| 2007/0080806 | A1 | 4/2007 | Lax et al. | |
| 2007/0095903 | A1 | 5/2007 | Suenbuel | |
| 2007/0108142 | A1 | 5/2007 | Medcalf et al. | |
| 2007/0115100 | A1 | 5/2007 | Mandie | |
| 2007/0171059 | A1 | 7/2007 | Pistilli | |
| 2007/0251900 | A1 * | 11/2007 | Hardy | A47F 1/126 211/59.3 |
| 2007/0265866 | A1 | 11/2007 | Fehling | |
| 2007/0267364 | A1 | 11/2007 | Barkdoll | |
| 2007/0267367 | A1 | 11/2007 | Mueller et al. | |
| 2007/0273513 | A1 | 11/2007 | White | |
| 2008/0015956 | A1 | 1/2008 | Regard | |
| 2008/0203253 | A1 | 8/2008 | Vogler | |

(56) References Cited

U.S. PATENT DOCUMENTS

2008/0307687 A1 12/2008 Nagel et al.
2008/0309489 A1 12/2008 Hachmann et al.
2009/0006196 A1 1/2009 Barkan et al.
2009/0079557 A1 3/2009 Miner
2009/0091448 A1 4/2009 Leyden et al.
2009/0095695 A1 4/2009 Moock et al.
2009/0101606 A1 4/2009 Olson
2009/0109027 A1 4/2009 Schuller
2009/0174566 A1 7/2009 Volk et al.
2009/0248198 A1* 10/2009 Siegel .................... G06Q 10/08 700/231
2009/0308494 A1 12/2009 Linn
2010/0012602 A1* 1/2010 Valiulis ................... A47F 1/126 211/59.3
2010/0013603 A1 1/2010 Chatani et al.
2010/0017025 A1* 1/2010 Lockwood .............. G07F 9/002 700/240
2010/0059469 A1* 3/2010 Mason .................... A47F 1/126 221/199
2010/0097223 A1 4/2010 Kruest et al.
2010/0175438 A1 7/2010 Sankey
2010/0200526 A1 8/2010 Barkdoll
2010/0237093 A1* 9/2010 Lockwood .............. G07F 11/42 221/279
2010/0238031 A1 9/2010 Belden, Jr. et al.
2010/0268792 A1 10/2010 Butler et al.
2011/0055103 A1* 3/2011 Swafford, Jr. ....... G06Q 10/087 705/345
2011/0062794 A1 3/2011 Vergoossen et al.
2011/0068921 A1 3/2011 Shafer
2011/0094975 A1* 4/2011 Hardy ................ A47B 87/0223 211/4
2011/0127225 A1 6/2011 Hooks, Jr. et al.
2011/0168652 A1 7/2011 Barkdoll
2011/0215060 A1 9/2011 Niederhuefner
2011/0215061 A1* 9/2011 Niederhuefner ........ A47F 1/128 211/59.3
2011/0218889 A1* 9/2011 Westberg ............. G06Q 10/087 705/28
2011/0227735 A1 9/2011 Fawcett et al.
2011/0282768 A1 11/2011 Swafford, Jr. et al.
2011/0284571 A1* 11/2011 Lockwood .............. G07F 9/002 221/151
2011/0310307 A1 12/2011 Takahashi
2012/0006764 A1 1/2012 Hachmann et al.
2012/0091162 A1* 4/2012 Overhultz ............ G06Q 10/087 221/6
2012/0120571 A1 5/2012 Bisesti et al.
2012/0209426 A1* 8/2012 Lockwood .............. G07F 17/10 700/240
2012/0253508 A1* 10/2012 Holmes ................... A47F 1/128 700/232
2012/0287090 A1 11/2012 Cacioppo
2012/0293330 A1 11/2012 Grant et al.
2013/0002422 A1* 1/2013 Wiese .................... G08B 13/08 340/539.1
2013/0024023 A1* 1/2013 Siegel ..................... A47F 1/126 700/244
2013/0057524 A1 3/2013 Bertin et al.
2013/0106259 A1 5/2013 Lockwood et al.
2013/0141240 A1 6/2013 Valiulis et al.
2013/0142494 A1 6/2013 Valiulis et al.
2013/0144433 A1* 6/2013 Lockwood .............. G07F 9/002 700/236
2013/0247834 A1 9/2013 Kodat
2013/0312644 A1 11/2013 Copeland
2014/0055264 A1 2/2014 Valiulis et al.
2014/0055266 A1 2/2014 Valiulis
2014/0061218 A1* 3/2014 Vogler .................... A47F 1/126 221/192
2014/0070948 A1 3/2014 Valiulis et al.
2014/0167962 A1* 6/2014 Valiulis ................... G07F 9/026 211/59.3
2014/0197953 A1 7/2014 Valiulis et al.
2014/0352372 A1 12/2014 Grant et al.
2015/0042178 A1 2/2015 Kim
2015/0068991 A1* 3/2015 Kostka .................... A47F 1/126 211/59.3
2015/0096997 A1* 4/2015 Obitts ..................... A47F 3/002 221/129
2015/0096998 A1 4/2015 Bird et al.
2015/0235501 A1* 8/2015 Wang .................. G07F 17/3297 221/262
2015/0238026 A1* 8/2015 Chambers ............... A47F 5/005 211/59.3
2015/0321827 A1 11/2015 Lockwood et al.
2015/0371482 A1 12/2015 Szpak et al.
2016/0005282 A1 1/2016 Lax et al.
2016/0132822 A1* 5/2016 Swafford ............. G06Q 10/087 705/28
2016/0180676 A1 6/2016 Slim
2017/0202369 A1* 7/2017 Mercier .................. A47F 5/083
2017/0303704 A1* 10/2017 Taylor ..................... G07F 9/026
2018/0047243 A1 2/2018 Swafford, Jr. et al.
2018/0107973 A1* 4/2018 Overhultz .............. G08B 13/14
2018/0242756 A1* 8/2018 Åberg ........................ A47F 1/04
2018/0365953 A1 12/2018 Ewing et al.
2019/0019140 A1* 1/2019 Costello ............... G06Q 10/087
2019/0183259 A1* 6/2019 Grant ...................... A47F 1/126
2019/0206212 A1 7/2019 Forster
2019/0272498 A1* 9/2019 Swafford ................ H04W 4/80
2019/0275498 A1 9/2019 Tanba et al.
2019/0290020 A1 9/2019 Ewing et al.
2019/0374048 A1 12/2019 Valiulis et al.
2021/0001785 A1 1/2021 Rose
2022/0000278 A1 1/2022 Ewing et al.
2022/0202207 A1 6/2022 Ewing et al.
2023/0059326 A1 2/2023 Ewing et al.
2023/0186740 A1 6/2023 Ewing et al.
2023/0210277 A1 7/2023 Ewing et al.
2023/0248160 A1 8/2023 Ewing et al.
2023/0252411 A1 8/2023 Ewing et al.

FOREIGN PATENT DOCUMENTS

CN 102124178 A 7/2011
CN 102763184 A 10/2012
CN 103158757 A 6/2013
CN 103198387 A 7/2013
CN 104631970 A 5/2015
CN 204351457 U 5/2015
CN 104981825 A 10/2015
CN 107462171 A 12/2017
CN 107529899 A 1/2018
CN 107845194 A 3/2018
CN 207264103 U 4/2018
CN 108694540 A 10/2018
CN 207943567 U 10/2018
DE 202005010088 U1 9/2005
DE 102007025747 A1 1/2008
DE 102011012163 A1 8/2012
EP 0868871 A1 10/1998
EP 1256296 A2 11/2002
EP 1541064 A1 6/2005
EP 1541064 B1 2/2006
EP 2 767 192 A1 8/2014
EP 2767191 A1 8/2014
EP 2888723 A1 7/2015
EP 2988281 A1 2/2016
GB 2304102 A 3/1997
GB 2360514 A 9/2001
JP H07241227 A 9/1995
JP 2007202664 A 8/2007
JP 3172383 U 12/2011
KR 20070079768 A 8/2007
KR 100823026 B1 4/2008
KR 20100137956 A 12/2010
KR 20110002261 U 3/2011
KR 20110043837 A 4/2011
KR 20110080411 A 7/2011
NL 1001794 C2 6/1997

(56) References Cited

FOREIGN PATENT DOCUMENTS

| | | | |
|---|---|---|---|
| WO | WO 9103967 | A1 | 4/1991 |
| WO | WO 9740724 | A1 | 11/1997 |
| WO | WO 9927824 | A1 | 6/1999 |
| WO | WO 0181988 | A2 | 11/2001 |
| WO | WO 2004/083051 | A2 | 9/2004 |
| WO | WO 2005/107535 | A1 | 11/2005 |
| WO | WO 2009/100857 | A1 | 8/2009 |
| WO | WO 2011/025085 | A1 | 3/2011 |
| WO | WO 2012/113536 | A1 | 8/2012 |
| WO | WO 2012/127849 | A1 | 9/2012 |
| WO | WO 2018/045038 | A1 | 3/2018 |

OTHER PUBLICATIONS

POS Tuning—für mehr Erfolg am Point of Sale: The POS T-Systemtray; http://www.postuning.de/68.0.hyml?L=2; website; Mar. 29, 2006; 1 page.

Indyme smartresponse; 2 pages printed from internet http://www.indyme.com/; date last visited Apr. 8, 2013.

U.S. Appl. No. 16/839,667, filed Apr. 3, 2020.

U.S. Appl. No. 17/727,496, filed Apr. 22, 2022.

U.S. Appl. No. 18/326,127, filed May 31, 2023.

* cited by examiner

ANTI-THEFT PUSHER WITH INCREMENTAL DISTANCE DETECTION

CROSS-REFERENCE TO RELATED PATENT APPLICATIONS

This patent application is a continuation of co-pending U.S. patent application Ser. No. 18/326,127, filed May 31, 2023, which is a continuation of U.S. patent application Ser. No. 17/727,496, filed Apr. 22, 2022, which issued as U.S. Pat. No. 11,707,141 on Jul. 25, 2023, which is a continuation of U.S. patent application Ser. No. 16/839,667, filed Apr. 3, 2020, which issued as U.S. Pat. No. 11,363,894 on Jun. 21, 2022, and which claims the benefit of U.S. Provisional Patent Application No. 62/830,045, filed Apr. 5, 2019, the entire teachings and disclosures of which are incorporated herein by reference thereto.

FIELD OF THE INVENTION

This invention generally relates to a retail merchandise pusher, and more particularly to a self-facing retail merchandise pusher incorporating anti-theft and inventory management technologies.

BACKGROUND OF THE INVENTION

Self-facing retail merchandise displays are generally known in the art. Once such typical display includes one or more pusher assemblies which may for example be situated on a retail merchandise shelf. A conventional pusher assembly incorporates a pusher that rides along an elongated track. The track may be a single drop in track with a single pusher slidable thereon, or it may be a structure defining multiple tracks for receipt of respective pushers. A spring is connected between the pusher and a leading edge of the track. The spring acts to bias the pusher forward along the track towards the leading edge thereof. A given display may utilize multiple pusher assemblies arranged generally in parallel to one another.

A user can retract the pusher away from the leading edge of the track and position items of retail merchandise (also referred to herein as products) in a linear row on top of the track and uncoiled portion of the spring, between the leading edge of the track and the pusher. The biasing force provided by the spring and exerted upon the pusher serves to bias the linear row of retail merchandise forward to ultimately “front face” the merchandise.

That is, when a customer removes the leading most item of merchandise from the linear row of merchandise, the pusher will be drawn forward by the spring to index the row of merchandise forward so that the next item of merchandise in the row is positioned proximate the leading edge of the track in an aesthetically pleasing manner. Such automatic front facing eliminates the necessity for retail store employees to manually face the merchandise, and thus ultimately reduces the cost of labor of the retailer.

The aforementioned pusher systems have been utilized in various retail display environments. One example is a retail shelf. Typically, a plurality of pusher bodies and their corresponding tracks are arranged in a side-by-side manner along the shelf. Each pusher and its corresponding track are separated by dividers to maintain a plurality of generally straight rows of merchandise that run from the front to the back of the shelf. Such a familiar configuration can be found in many retail stores for selling hygiene items such as deodorant, as one example.

In another configuration, the pusher system may be embodied as a stand-alone pusher tray. These trays may include means for mounting the tray as a cantilevered extension from another structure, such as a bar. These trays may also be situated directly on a retail shelf. Further, these trays may include side barriers which are adjustable so as to accommodate merchandise of differing widths. Examples of these trays may be readily seen at U.S. Pat. Nos. 9,254,049, 9,241,583, 8,720,702, each of which is incorporated by reference herein in its entirety.

Loss prevention is a continuing problem in the retail industry. Current anti-theft systems involve locking up merchandise behind counters that are far away from other related merchandise, or locking up the merchandise in secure cabinets that are closer to where the related merchandise is generally stored.

Heretofore, there have been limited attempts at incorporating anti-theft technology into pusher systems themselves. Such attempts, while sufficient for a majority of loss prevention scenarios may not detect very small movements of the pusher, e.g., where very small merchandise is contained in the pusher system such that removal of one item or even several creates a very small movement in the pusher.

Other challenges arise in self-facing retail merchandise displays with regard to inventory management. Because the merchandise contained in such displays is typically high purchase volume merchandise, e.g., deodorants, razor blades, medicines, etc., it is not uncommon for one or more rows of the display to become completely empty for some time before being restocked. Accordingly, such displays must be routinely inspected by store personnel to ensure that they have adequate stock levels. This inspection may be overlooked from time to time in the event the store is understaffed, or adequately staffed but very busy. Such manual inspection, while necessary, diverts store personnel from other potentially more pressing activities such as customer service.

Accordingly, there exists a need in the art for a retail merchandise pusher display, pusher assembly, and pusher incorporating a system for retail stores that will deter theft and enhance inventory management of such displays.

BRIEF SUMMARY OF THE INVENTION

In one aspect, embodiments of the invention provide a retail merchandise pusher configured for sliding along a track of a pusher assembly, where the pusher assembly is mountable to a retail merchandise shelf. The pusher includes a housing, a spring drum rotatably mounted within the housing, and a coil spring mounted to the spring drum. The coil spring is coilable and uncoilable upon rotation of the spring drum. A controller is coupled to a sensor arrangement carried within the housing. The sensor arrangement includes a spring drum sensor for detecting rotation of the spring drum. A direction sensor detects a direction of rotation of the spring drum, while an incremental distance sensor detects an incremental movement of the pusher. The controller is configured to calculate, based on data from the sensor arrangement, a total distance and direction of travel by the pusher, and also configured to generate an alarm when the pusher travels more than a threshold distance within a predetermined period of time.

In a particular embodiment, the alarm is at least one of a visual, audible, or RF signal. The controller may be coupled to an output device disposed in the housing, where the output device is configured to produce the alarm as a visual or audible signal. Furthermore, the controller may be coupled to a transmitter disposed in the housing, where the transmitter is configured to wirelessly transmit data to a remote receiver. The aforementioned data includes at least one of an alarm status, and the total distance and direction of travel by the pusher.

In particular embodiments, the controller is configured to transmit information, based on data from the sensor arrangement, wherein the information includes an inventory status for the pusher assembly. As used in this application, the term “inventory status” or “stock status” relates to the number of merchandise items remaining in a particular pusher assembly. The movement of the pusher, which may indicate either the replenishment or the removal of goods from the pusher assembly, typically results in a change of the inventory status for the pusher assembly. In more particular embodiments, the controller comprises a microprocessor.

In some embodiments, the spring drum sensor includes a pair of opposed electrical contacts and a tab extending from the spring drum, the tab rotatable with the spring drum, wherein the tab is arranged to bias one of the pair of opposed electrical contacts into contact with the other one of the pair of the opposed electrical contacts at each complete revolution of the spring drum.

In other embodiments, the direction sensor includes a first electrical contact, a common electrical contact, and a second electrical contact, the common electrical contact interposed between the first electrical contact and the second electrical contact. In a further embodiment, a distal end of common electrical contact is intermittently in contact with gear teeth formed on an outer periphery of the spring drum such that the common electrical contact is biased by the gear teeth into contact with the first electrical contact when the spring drum rotates in a first direction, and biased by the gear teeth into contact with the second electrical contact when the spring drum rotates in a second rotational direction opposite the first rotational direction.

In certain embodiments, the incremental distance sensor includes a sensing gear in contact with the spring drum, and a slotted disc mounted to the sensing gear, the incremental distance sensor further comprising a light sensor arrangement configured to produce and detect a beam of light. In a further embodiment, a peripheral region of the slotted disc is movable through a sensing region through which the beam of light extends, wherein the peripheral region includes a plurality of slots formed therein, wherein the plurality of slots sequentially pass through the sensing region as the sensing gear rotates such that the beam of light alternately passes through and is blocked by the plurality of slots. The light sensor arrangement may include a light emitter located on a first side of the slotted disc, and a light sensor located on a second side of the slotted disc opposite the first side, the light sensor arranged to detect the beam of light emitted by the light emitter.

In more particular embodiments, the light emitter is arranged to emit the beam of light such that it is perpendicular to a plane of rotation defined by the slotted disc. In other embodiments, the coil spring is configured to bias the housing toward one end of the track. Further, the pusher may be configured to permit a user to set or adjust at least one of the threshold distance and the predetermined period of time. In some embodiments, the pusher includes a reset control to set a zero position for the controller, the zero position indicating that no merchandise is contained in the pusher assembly such that the pusher is at an end of the track.

In another aspect, embodiments of the invention provide a pusher assembly configured for mounting to a retail shelf, the shelf having a front and a back, wherein retail merchandise situated near the front of the shelf is removable from the pusher assembly. The pusher assembly includes a track, and a pusher mounted to the track. The pusher is slidable toward and away from the front of the shelf. The pusher includes a controller coupled to a sensor arrangement for detecting movement and a direction of travel by the pusher. The controller is configured to calculate, based on data from the sensor arrangement, a total distance traveled by the pusher along the track. The controller is further configured to generate an alarm when the pusher travels more than a threshold distance within a predetermined period of time.

In a particular embodiment, the sensor arrangement includes a spring drum sensor, a direction sensor, and an incremental distance sensor. In one embodiment, the spring drum sensor includes a pair of opposed electrical contacts and a tab extending from a rotatable spring drum of the pusher, the tab rotatable with the spring drum, wherein the tab is arranged to bias one of the pair of opposed electrical contacts into contact with the other one of the pair of the opposed electrical contacts at each complete revolution of the spring drum.

In another embodiment, the direction sensor includes a first electrical contact, a common electrical contact, and a second electrical contact, the common electrical contact interposed between the first electrical contact and the second electrical contact. The incremental distance sensor may include a sensing gear in contact with the spring drum the gear including a slotted disc mounted to the gear, the incremental distance sensor further comprising a light sensor arrangement configured to produce and detect a beam of light.

In certain embodiments, the alarm is at least one of a visual, audible, or RF signal, and the controller is coupled to a transmitter configured to wirelessly transmit data to a remote receiver. The aforementioned data includes at least one of an alarm status, and the total distance and direction of travel by the pusher. The pusher may be further configured to permit a user to set or adjust at least one of the threshold distance and the predetermined period of time, and to include a reset control to set a zero position for the controller. The zero position indicates that no merchandise is contained in the pusher assembly such that the pusher is at an end of the track. The controller may be configured to provide, based on data from the sensor arrangement, an inventory status of the pusher assembly.

In yet another aspect, embodiments of the invention provide a retail merchandise display system for self-facing retail merchandise. The retail merchandise display includes a shelf, and at least one pusher assembly mounted to the shelf. The at least one pusher assembly includes a track, and a pusher slidable along the track. The pusher assembly includes a controller coupled to a sensor arrangement. The controller is configured to calculate, based on data from the sensor arrangement, a large-scale movement of the pusher, and an incremental movement by the pusher, where the controller is configured to generate a local alarm when a total distance traveled by the pusher, where the total distance is equal to a sum of the large-scale movement and the incremental movement, is greater or equal to a predefined distance. The pusher includes a transmitter operable to wirelessly communicate the total distance traveled by the pusher. A receiver is remotely located from the pusher, and configured to receive a wireless signal from the transmitter, and configured to generate a remote alarm in concert with the local alarm.

In certain embodiments, the local and remote alarms are at least one of visual or audible alarms. In other embodiments, the at least one pusher assembly includes a plurality of pusher assemblies, wherein each one of the plurality of pusher assemblies wirelessly communicate with the receiver. Still, in other embodiments, the receiver includes an RF receiver, an audio speaker, and a Wi-Fi module configured to transmit data received from the pusher. Further, the wireless signal may be an RF signal.

In some embodiments, the sensor arrangement includes a spring drum sensor, a direction sensor, and an incremental distance sensor. Further, the receiver may be configured to transmit data received from the pusher to a computer or mobile device, such that the data allows the computer or mobile device to display information regarding the pusher assembly. Moreover, the information regarding the pusher assembly may include at least one of an alarm status, and inventory status, and a position of the pusher.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an exemplary embodiment of a retail merchandise display system that incorporates a pusher assembly. The pusher assembly includes a pusher which includes a new and inventive sensor arrangement for detecting and calculating relatively small movements of the pusher. Such a configuration is highly advantageous for loss prevention and inventory management purposes, particularly loss prevention and inventory management of relatively small products.

Indeed, the high resolution of the distance detection of the pusher enables an accurate calculation of a number of products removed from the retail merchandise display in a single movement cycle or in a given period of time. For example, a movement cycle (i.e., a continuous movement of the pusher) reflecting a relatively long distance traveled by the pusher is indicative of a number of products removed in a single movement of the pusher. As another example, a large number of separate movement cycles during a relatively short period of time is also indicative of a number of products removed from the display. In either case, each is indicative of a potential theft event. The system described herein is operable to generate one or both of a local and a remote alarm when such potential theft conditions are met. Further, the system described herein also communicates the information it collects regarding pusher movement for purposes of managing the inventory of that particular pusher assembly.

Figure 1:
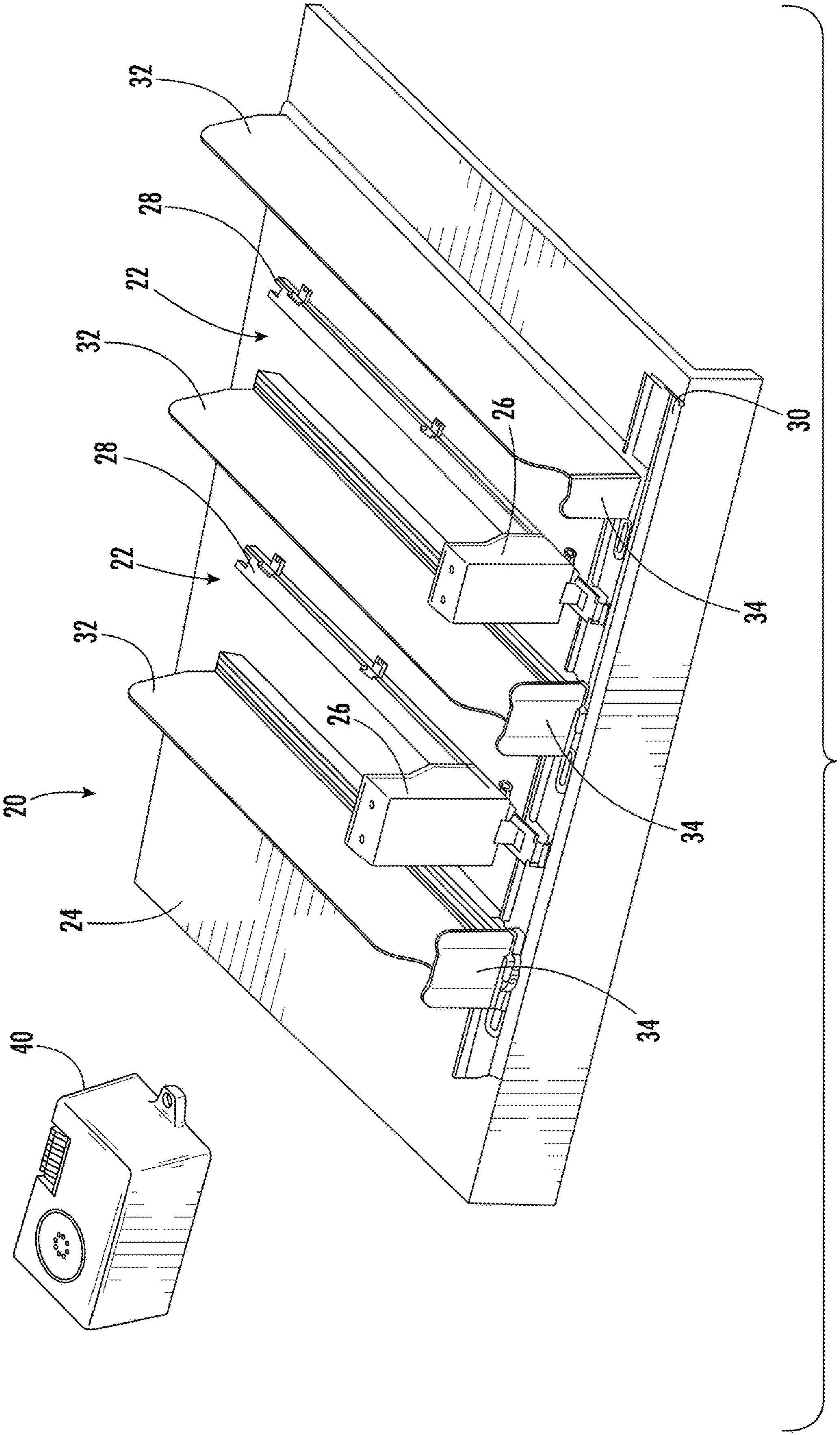
FIG. 1 is a perspective view on exemplary embodiment of a retail merchandise display system that incorporates a pusher assembly constructed in accordance with an embodiment of the invention.

With particular reference to FIG. 1, the same illustrates an exemplary embodiment of a retail merchandise display system 20 (also referred to herein as display 20). Display 20 included one or more pusher assemblies 22 mounted to a shelf 24. Each pusher assembly 22 includes a pusher 26 that is slidable along a track 28. Each pusher 26 houses a coil spring described below which attaches to shelf 24 directly, or as shown in the illustrated embodiment, to an external structure that in turn is mounted to shelf 24 such as a mounting rail 30. The pusher 26 is biased by this coil spring 80 toward one end of the track 28. In the embodiment shown, the pusher 26 is biased by this coil spring 80 toward the mounting rail 30, i.e., from the back of shelf 24 toward the front of shelf 24.

As described in greater detail below, pusher 26 houses a sensor arrangement which is operable to calculate the distance traveled by pusher 26 along track 28, and to determine the direction of such travel, e.g., from the back to the front of shelf 24, or from the front to the back of shelf 24. In event that such movement is indicative of a potential theft event, pusher 26 is also operable to generate a local alarm at pusher 26, and/or a remote alarm at a receiver 40 of display 20 located remotely from the remainder of display 20. The term "alarm" as used herein should be taken to mean any audible or visual cue designed to draw attention to display 20, such as beeps, tones, prerecorded messages, flashing or continuous lights, etc., but is also intended to include any electronic signal which could be used to serve as a warning. Such remote alarm functionality is particularly advantageous as receiver 40 may be located with security or other personnel that can readily respond to a potential theft event. The remote alarm generated by receiver 40 may be simultaneous and in concert with the local alarm generated by the pusher 26.

Still referring to FIG. 1, two pusher assemblies 22 are illustrated. However, display 20 may utilize fewer or greater pusher assemblies. Indeed, in the case of smaller products, a relatively large number of pusher assemblies 22 may be situated on shelf 24. Further, display 20 may optionally also include a plurality of dividers 32 as shown, for keeping adjacent rows of product confined from one another. Each divider 32 may also include its own integrated front stop 34 as shown, for stopping the forward motion of products as they are biased by pusher 26. Alternatively, a front stop may be mounted directly to shelf 24 (or be formed by the shelf itself) or alternatively to mounting rail 30. With the foregoing description in hand, it will be readily recognized that mounting rail 30, dividers 32, and front stops 34 are optional components that may take on different forms or may be omitted entirely within the scope of the invention described herein.

Figure 2:
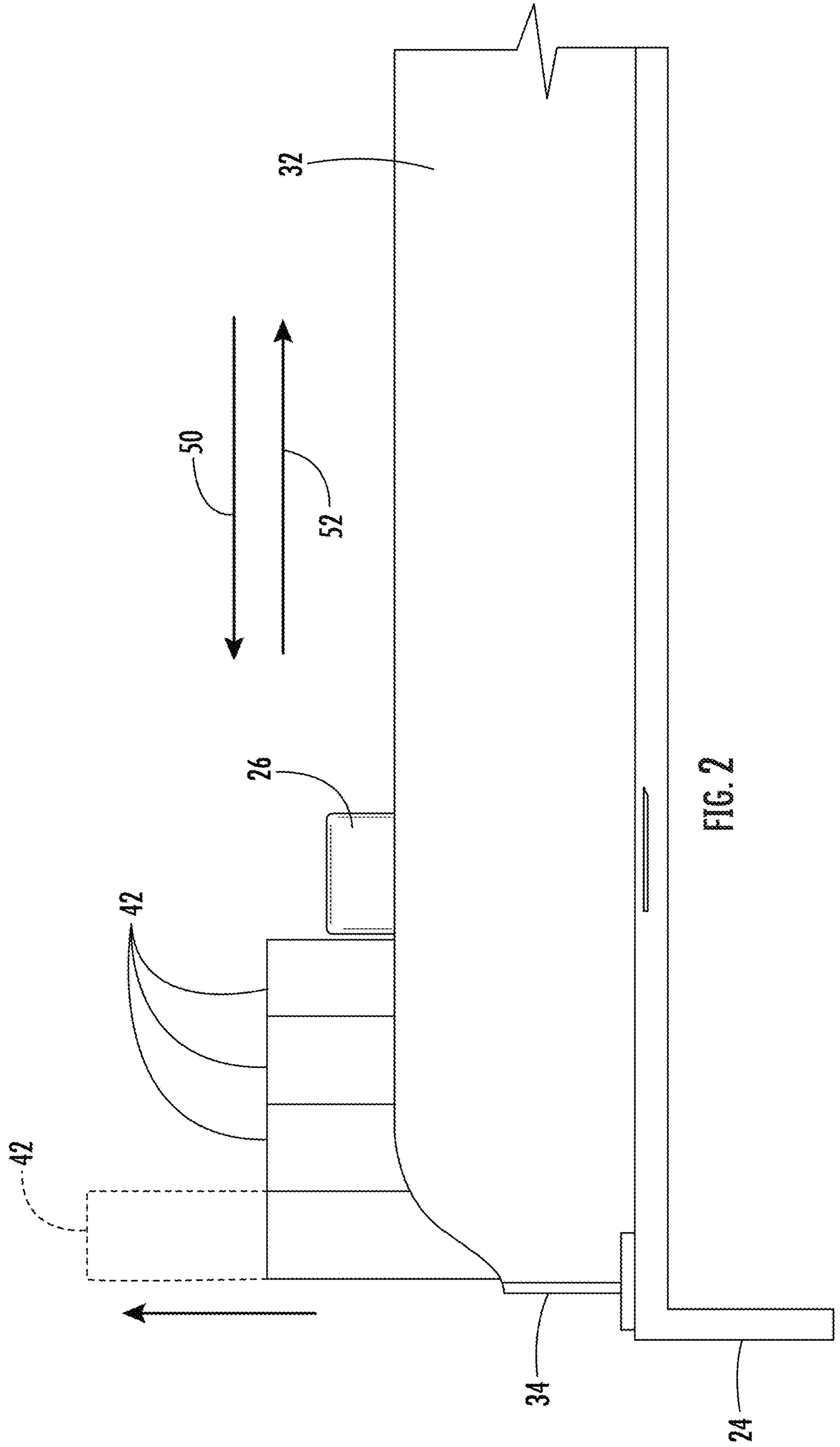
FIG. 2 is a side view of the retail merchandise display system of FIG. 1.

Turning now to FIG. 2, pusher assembly 22, and particularly pusher 26, is operable to bias products 42 forward, i.e., in direction 50 shown in FIG. 2. The leading product 42 is removable from display 20 as shown. In a potential theft event, multiple or even all of products 42 may be removed in a single action, or in multiple quick successive actions. In either case, pusher 26 will move a relatively large distance forward in direction 50. As introduced above and described below, pusher 26 is operable to determine the distance it has traveled, and generate an appropriate alarm when the distance is beyond a predetermine threshold. As discussed herein, the alarm may be a visual alarm, audible alarm, or electronic signal such as a wireless or RF signal which could serve as a warning to the system user. Further, the alarm may be any combination or all of the aforementioned types.

Figure 3:
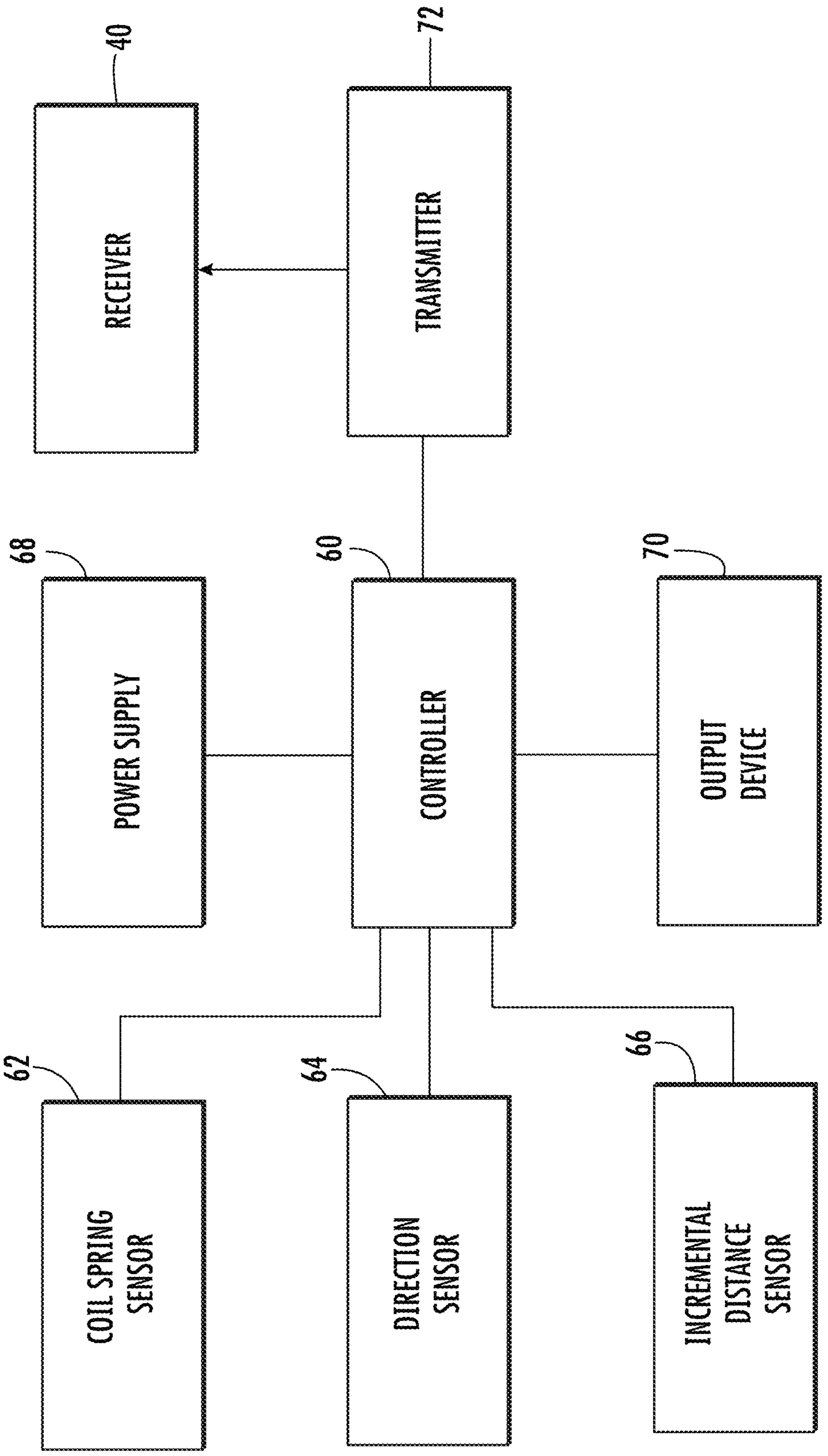
FIG. 3 is a schematic illustration of the operational topology of the retail merchandise display system, according to an embodiment of the invention.

With reference to FIG. 3, pusher 26 incorporates a new and inventive sensor arrangement for achieving the foregoing functionality. The topology shown in FIG. 3 depicts this sensor arrangement and additional componentry necessary to achieve the functionality herein. In particular, the sensor arrangement includes a spring drum sensor 62, a direction sensor 64, and an incremental distance sensor 66 which in combination determine the distance and direction traveled by pusher 26. Each of the foregoing components of the sensor arrangement is in operable communication with a controller 60. Controller 60 may for example be a microprocessor, or any other firmware, hardware, or software necessary to achieve the functionality herein.

Controller 60 is coupled to a local power supply 68 and an output device 70. Local power supply 68 provides electrical power to the controller and/or sensor arrangement to achieve the operation described herein. Output device 70 produces the above-introduced local alarm, and as such, may be embodied as any device capable of producing such an alarm. As will be explained in more detail below, the controller 60 is configured to calculate, based on data from the sensor arrangement, a total distance and direction of travel by the pusher 26, and to generate an alarm when the pusher 26 travels more than a threshold distance within a predetermined period of time. As will be explained below, the pusher 26 may include controls to allow the user to adjust the threshold distance and the predetermined period of time.

Controller 60 is also in communication with a transmitter 72 which wirelessly sends the distance and direction of travel information, alarm status, and any other information collected by controller 60 to receiver 40, shown schematically in FIG. 3. As used in this application, the term "alarm status" refers to whether or not an alarm is being triggered or has been triggered by the controller 60. This wireless communication may use any known radio frequency (RF) communication protocol. The data transmitted from the controller 60 to the receiver 40 may include at least one or all of an inventory status, alarm status, and total distance and direction of travel by the pusher 26. In at least one embodiment of the invention, there are a plurality of pusher assemblies 22, wherein each one of the plurality of pusher assemblies 22 wirelessly communicates with the receiver 40. In certain embodiments, the receiver 40 includes at least one of an RF receiver, an audio speaker, and a Wi-Fi module which is configured to wirelessly transmit data (e.g., as an RF signal) received from the pusher 26.

Figure 4:
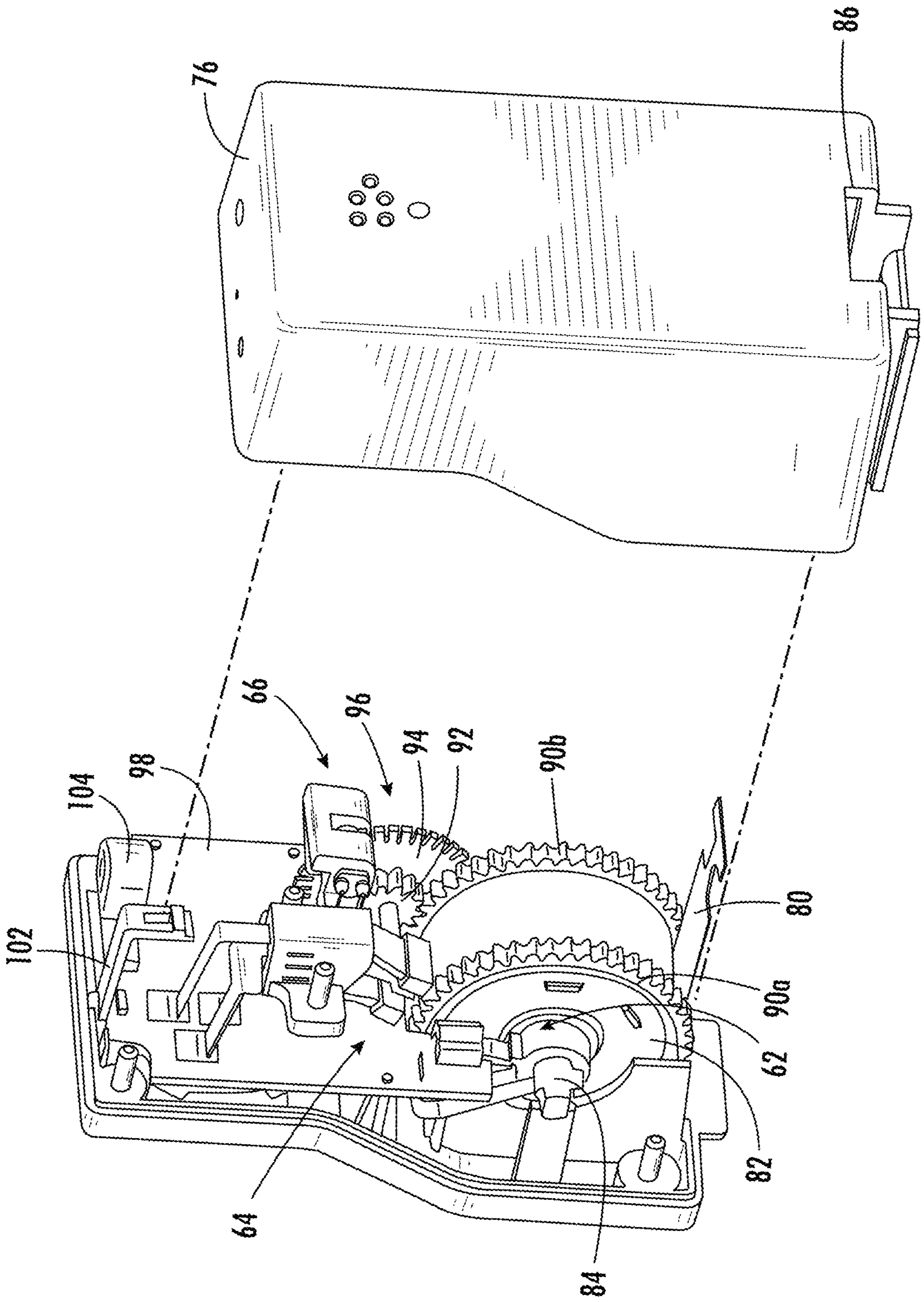
FIG. 4 is a perspective exploded view of a pusher of the pusher assembly, according to an embodiment of the invention.

Turning to FIG. 4, the same illustrates pusher 26 in a partially exploded view. Pusher 26 includes an outer housing 76 that has been partially removed to reveal the interior componentry of pusher 26. Pusher 26 carries a coil spring 80. Coil spring 80 is mounted on a spring drum 82. Spring drum 82 is rotatable about a shaft 84 to allow, in specific embodiments, an uncoiled portion of coil spring 80 to be paid out or retracted through an opening 86 formed in housing 76.

As can be seen in FIG. 4, spring drum 82 includes gear teeth 90*a*, 90*b* formed at opposed peripheral side edges of spring drum 82. Gear teeth 90*a* are used to repeatedly actuate a portion of direction sensor 64 as described below. Gear teeth 90*b* mesh with a sensing gear 92 of incremental distance sensor 66 as shown. As described in greater detail below, sensing gear 92 includes a slotted disc 94 mounted to or formed integrally with sensing gear 92.

Slotted disc 94 includes a plurality of slots 96 formed in a peripheral region thereof as shown. These slots successively block a beam of light of incremental distance sensor 66 as sensing gear 92 rotates. This action creates successive light pulses which are detected by incremental distance sensor 66 and used to measure the distance traveled by pusher 26 with a high resolution.

Each of the spring drum sensor 62, direction sensor 64, and incremental distance sensor 66 are coupled to a printed circuit board (PCB) 98 as shown to achieve the topology illustrated in FIG. 3. Additionally, a reset control 102 which may be a button, switch, or dial, and threshold distance control 104 are also coupled to PCB 98 to achieve the functionality described herein. Thus, embodiments of the pusher 26 include the reset control 102 to set a zero position for the controller 60, the zero position indicating that no merchandise is contained in the pusher assembly 22 such that the pusher 26 is at the front end of the track 28.

Figure 5:
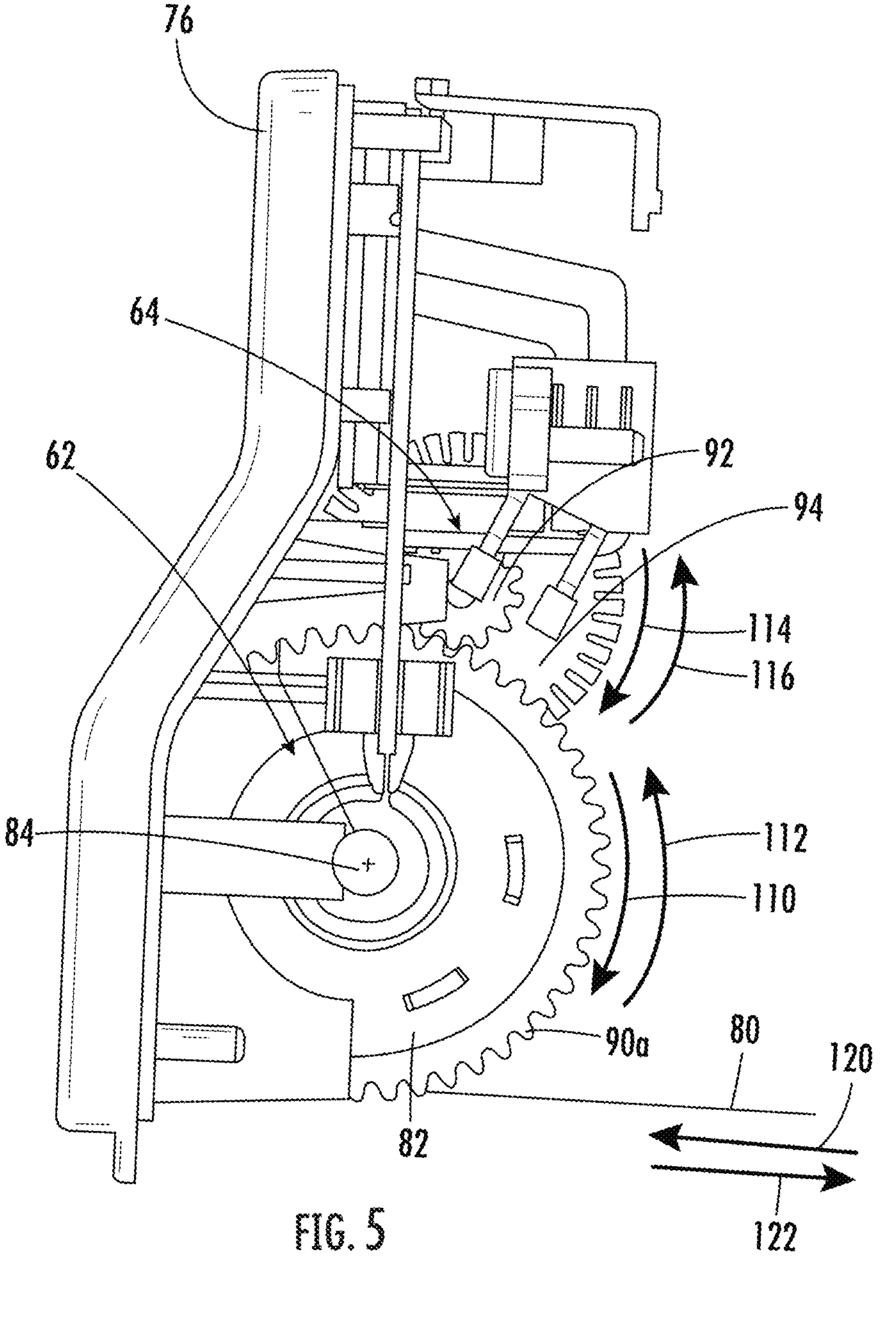
FIG. 5 is a side view of the pusher, with a portion of its outer housing removed, according to an embodiment of the invention.

With reference to FIG. 5, when a portion of coil spring 80 is uncoiled and then is recoiled onto spring drum 82 by moving in direction 120, spring drum 82 rotates in direction 110 as shown. Movement of coil spring 80 in direction 120 is indicative of pusher 26 moving toward the front of shelf 24 (see FIGS. 1, 2), i.e., is indicative to a product or products 42 being removed from display 20.

Due to the contact between spring drum 82 and sensing gear 92, this causes sensing gear 92 and its associated slotted disc 94 to rotate in direction 116 as shown. Conversely, movement of spring 80 in direction 122 causes spring drum 82 to rotate in direction 112 as shown. Movement of coil spring 80 in direction 122 is indicative to usher 26 moving toward the back of shelf 24 (see FIGS. 1, 2), i.e., is indicative of product or products 42 being restocked into display 20. This in turn causes sensing gear 92 and slotted disc 94 to rotate in direction 114.

Figure 6:
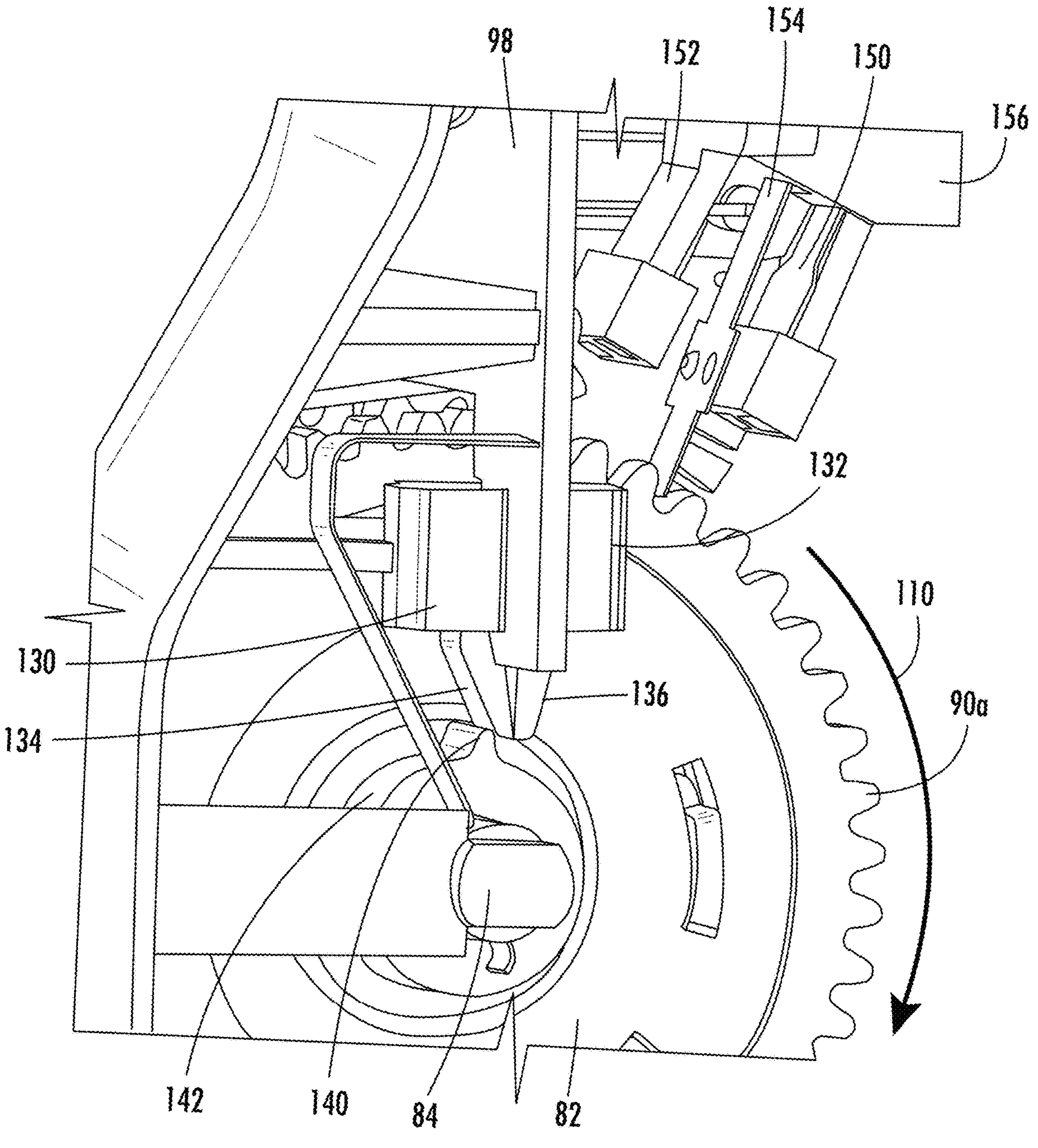
FIG. 6 is a perspective view of the pusher, with a portion of its outer housing removed, according to an embodiment of the invention.

Turning now to FIG. 6, the operation of spring drum sensor 62 and direction sensor 64 will be described in greater detail. Turning first to spring drum sensor 62, the same includes a pair of opposed electrical contacts 134, 136 as shown. Contact 134 is coupled to PCB 98 by way of a housing 130. Similarly, contact 136 is coupled via a housing 132 to PCB 98. Each electrical contact 134, 136 is generally flexible so that it may readily move into and out of contact with the other contact.

As spring drum 82 rotates, a radially protruding tab 140 mounted to a hub 142 of spring drum 82 rotates as well. Upon each full revolution of spring drum 82, tab 140 will bias contacts 134, 136 together. In the illustration of FIG. 6, spring drum 82 is rotating in direction 110, and thus tab 140 has biased contact 134 into contact with 136.

Controller 60 is operable to detect when electrical contacts 134, 136 are in contact with one another, and records this information. Two successive contacts between electrical contacts 134, 136 signifies one full revolution of spring drum 82, which corresponds to a linear movement of spring 80 and hence a linear movement of pusher 26.

Direction sensor 64 is used to direction the rotational direction of spring drum 82 as movement is detected. Indeed, while two successive contacts of electrical contacts 134, 136 provides an indication of a linear distance moved by pusher 26, these contacts do not provide an indication of which direction pusher 26 was moving during that time. The operation of direction sensor 64 is thus used to correlate a direction with the movement detected.

Direction sensor 64 includes a first electrical contact 150, a second electrical contact 152, and a common electrical contact 154 interposed between first and second electrical contacts. Common electrical contact 154 is resiliently movable into contact with either one of first or second electrical contacts 150, 152. Each of these contacts, 150, 152, and 154 are insulated from one another via a housing 156, and coupled to PCB 98.

For example, as spring drum 82 rotates in direction 110 as shown, a distal end of common electrical contact 154 is intermittently but repeatedly contacted by the teeth of gear teeth 90*a*, and repeatedly brought into contact with first electrical contact 150. Conversely, when spring drum 82 rotates in direction 112 (see FIG. 5), common electrical contact 154 is repeatedly brought into contact with second electrical contact 152. Controller 60 is operable to recognize that successive contact between common electrical contact 154 and first electrical contact 150 is indicative of pusher 26 moving toward the front of shelf 24 (see e.g., FIGS. 1, 2). Conversely, controller 60 is also operable to recognize that successive contact between common electrical contact 154 and second electrical contact 152 is indicative of pusher 26 moving toward the rear of shelf 24 (see e.g., FIGS. 1, 2).

It will be recognized, however, that spring drum sensor 62 can detect only large-scale movement of pusher. As used herein, “large-scale movement” means movement of pusher 26 which corresponds to one full revolution of spring drum 82. In order to determine incremental movement of pusher 26, incremental distance sensor 66 is employed. As used herein, “incremental movement” of pusher 26 means movement that is less than a large-scale movement. Indeed, in a single movement cycle, i.e., an uninterrupted movement of pusher 26, the same may move some distance prior to and/or after the two successive contacts of contacts 134, 136 that signifies one large-scale movement. Incremental distance sensor 66 is thus used to determine this additional distance.

Figure 7:
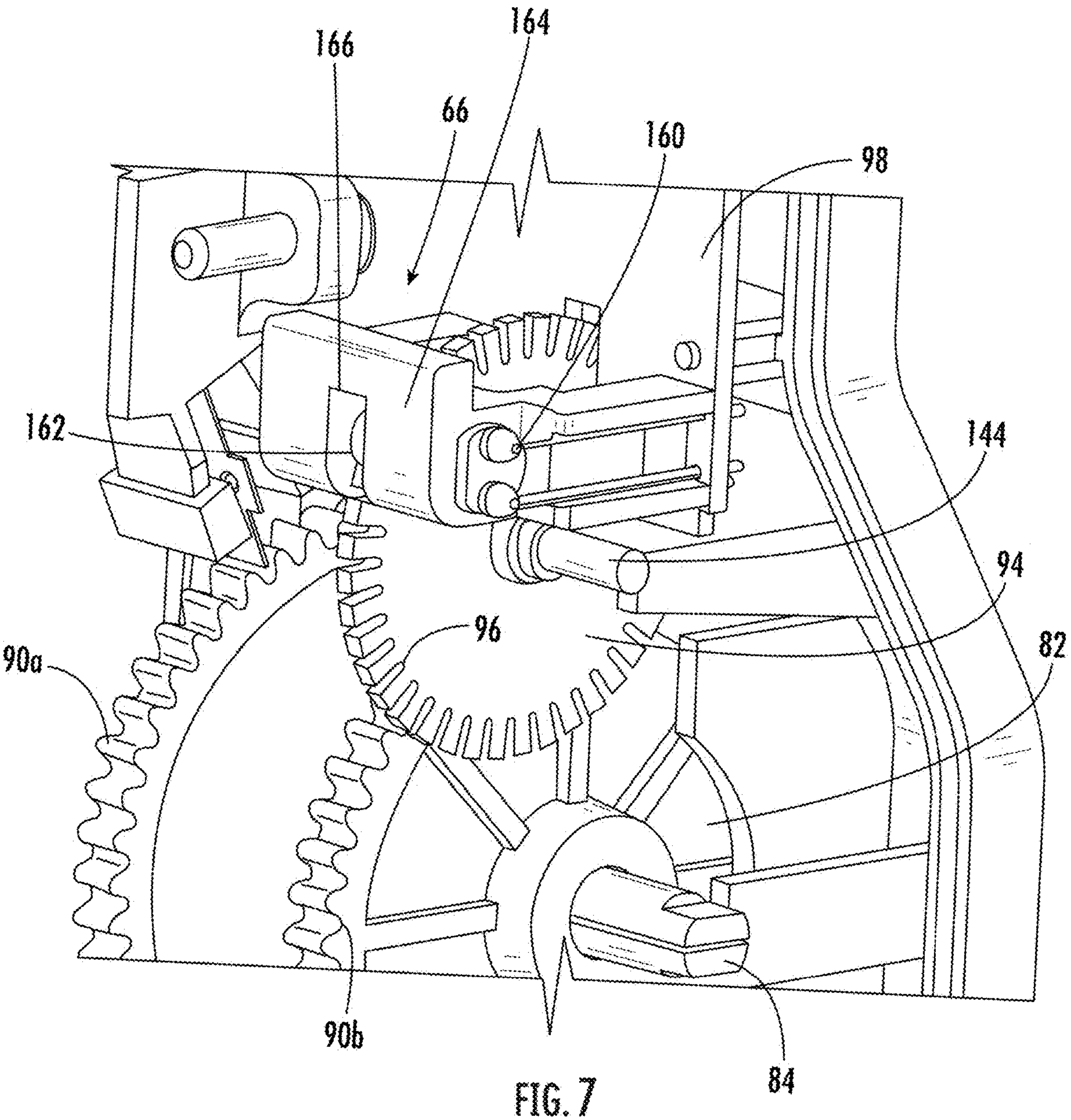
FIG. 7 is another perspective view of the pusher, with a portion of its outer housing removed, according to an embodiment of the invention.
Figure 8:
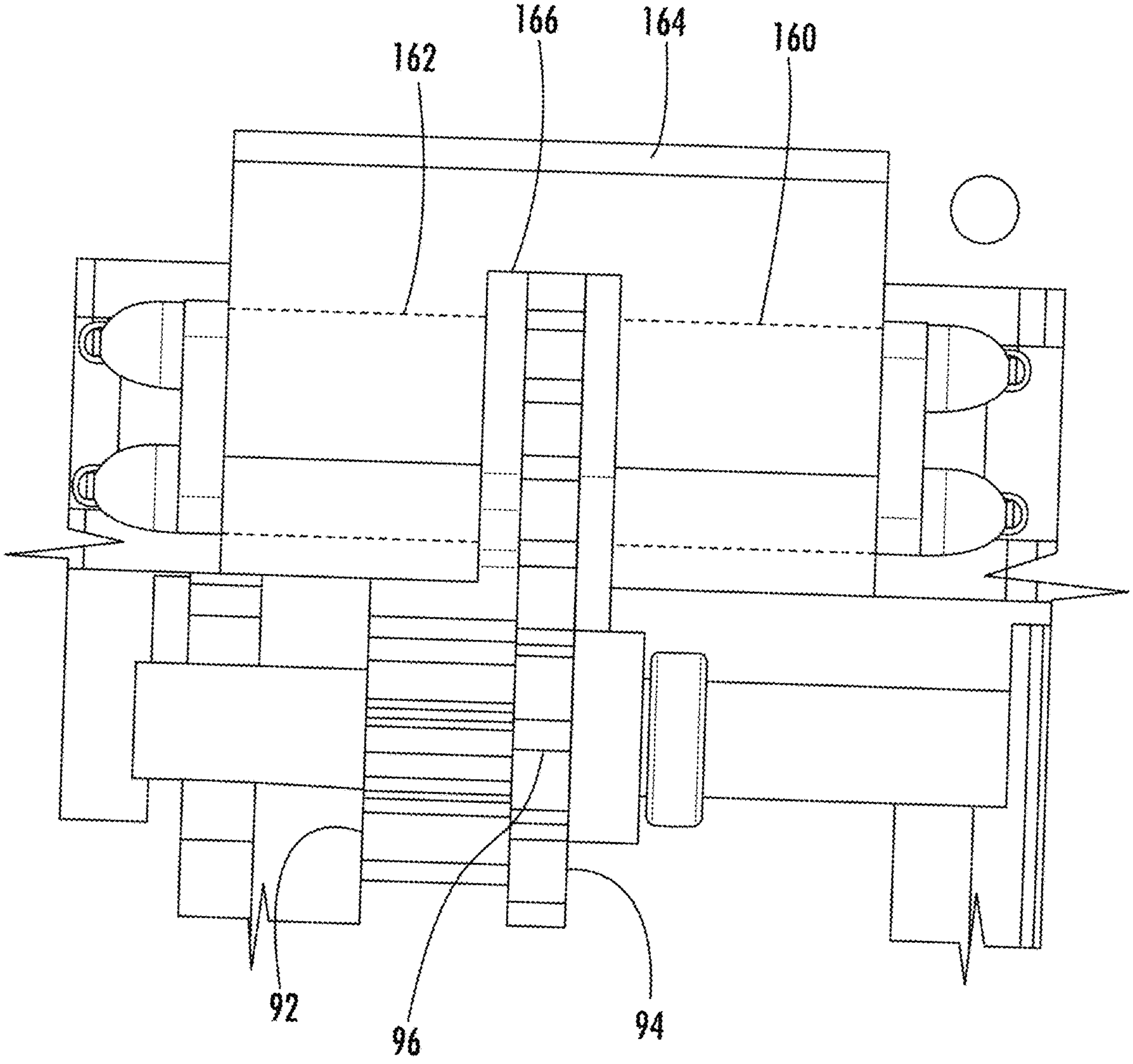
FIG. 8 is a partial front view of an incremental distance sensor of the pusher, according to an embodiment of the invention.

With reference to FIGS. 7 and 8, incremental distance sensor 66 includes the aforementioned sensing gear 92 and slotted disc 94, which are rotatable about an axis defined by shaft 144 upon a corresponding rotation in spring drum 82. Incremental distance sensor 66 also includes a light sensor arrangement comprising a light emitter 160 aimed at a light receiver 162 for detecting the presence or absence of a beam of light emitted from emitter 160. Emitter 160 and receiver 162 are mounted to a housing 164 as shown. Housing 164 includes a slot 164 which defines a sensing region. The peripheral region of slotted disc 94 rotates through this sensing region. The slots 96 thereby successively interrupt the beam of light from emitter 160.

As a result, receiver 162 detects pulses of light. Due to the equally spaced and regular arrangement of slots 96, these pulses thus each correspond to a small linear movement of pusher 26. Put differently, the pulses can be summed at controller 60 so as to determine a total distance moved by pusher 26 in any given movement cycle. Due to this very fine measurement, the resolution of distance measurement of pusher 26 is relatively high. As such, even very minor movements of pusher 26 corresponding for example very thin products 42 being removed can be detected. It will be recognized that incremental distance sensor 66 thus functions as a rotary encoder used for linear distance measurement.

The following provides an example of the distance measurement functionality of pusher 26. In this particular example, the gear ratio between spring drum 82 and sensing gear 92 is 1:4. Spring drum 82 has an outer diameter of 13.5 mm. As a result, one full revolution of spring drum 82 as detected by spring drum sensor 62 corresponds to 84.8 mm (i.e., 2*pi*13.5). Also in this example, there are 40 slots 96 formed on slotted disc 94. As such, one full revolution of slotted disc 94 generates 40 light pulses. Due to the aforementioned 1:4 gear ratio, one full revolution of spring drum 82 will cause four full revolutions of slotted disc 94, and hence 160 light pulses for every one full revolution of spring drum 82. Dividing the circumference of spring drum 82 by this total number of pulses, (i.e., 84.8 mm/160 pulses) each pulse therefor corresponds to 0.53 mm of linear movement.

For the purposes of this example, it will be assumed that pusher 26 has moved 200 mm in a movement cycle. From start to finish in this movement cycle, pusher 26 will first move some distance prior to contacts 134, 136 making their first contact. These contacts 134, 136 will then make a second contact after spring drum 82 completes a full revolution (i.e., a revolution as measured by a first and a second contact of contacts 134, 136). Contacts 134, 136 will then make a third contact after another full revolution of spring drum 82 (i.e., as measured by the third contact of contacts 134, 136 occurring after the aforementioned second contact). Pusher will then move some distance after this third contact.

During the aforementioned movement, incremental distance sensor 66 sensed pulses of light. Assume for this example 15 pulses were detected prior to the first contact of contacts 134, 136, this distance portion correlates to a distance of 15*0.53 mm or 7.95 mm. Also assume for this example that 42 pulses were detected after the third contact of contacts 134, 136, this distance portion correlates to a distance of 42*0.53 mm or 22.26 mm. Also, as already mentioned, three total contact events between contacts 134, 136 were detected, which amounts to two full revolutions of spring drum 82, correlating to a distance portion of 169.6 mm. Summing the aforementioned distance portions, a total travel distance of approximately 200 mm has been detected.

In terms of loss prevention, the user can set an alarm threshold distance using threshold distance control 104 which may be a button, switch, dial, or any similarly suitable means for setting the alarm threshold distance. This threshold distance is the distance in a movement cycle observed by pusher 26 in which an alarm will be generated. The pusher 26 may include a control, similar to the threshold distance control 104, which allows the user to adjust a time period during which the alarm threshold distance must be exceeded in order to generate the alarm. All distance measurements and alarm conditions can be transmitted to receiver 40. Further, receiver 40 may be in communication with or embody inventory management software such that in addition to loss prevention, each pusher assembly 22 can also communicate information regarding its stock status, etc. As such, receiver 40 may incorporate or be in communication with a user interface for inputting an alarm threshold and/or a product depth as discussed below. In general, the capability of high-resolution distance measurement can be used for anti-theft and inventory management functions.

Referring back momentarily to FIG. 1, in terms of inventory management, the data communicated by each pusher 26 is also associated with a unique location identifier for each pusher. This enables the inventory management software to differentiate between the various pushers 26 in the system, and monitor the inventory of each. As such, a user can also define a product size for, i.e., depth, for one item of product in the pusher assembly 22. The pusher 26 may then correlate the locally at controller 60, or remotely at receiver 40 or any inventory management software integrated with or in communication with receiver 40, the distance it has traveled to a number of products removed from pusher assembly 22. As an example, a user may indicate that a single item has a one-inch depth. A movement of ten inches, therefore, amounts to ten products being removed. A user may set this minimum product depth using threshold distance control 104, or they may set it at receiver 40 or the inventory management software embedded in or associated therewith. The threshold distance control 104 may be a dial, button, switch, or any suitable means for setting the minimum product depth.

Figure 9:
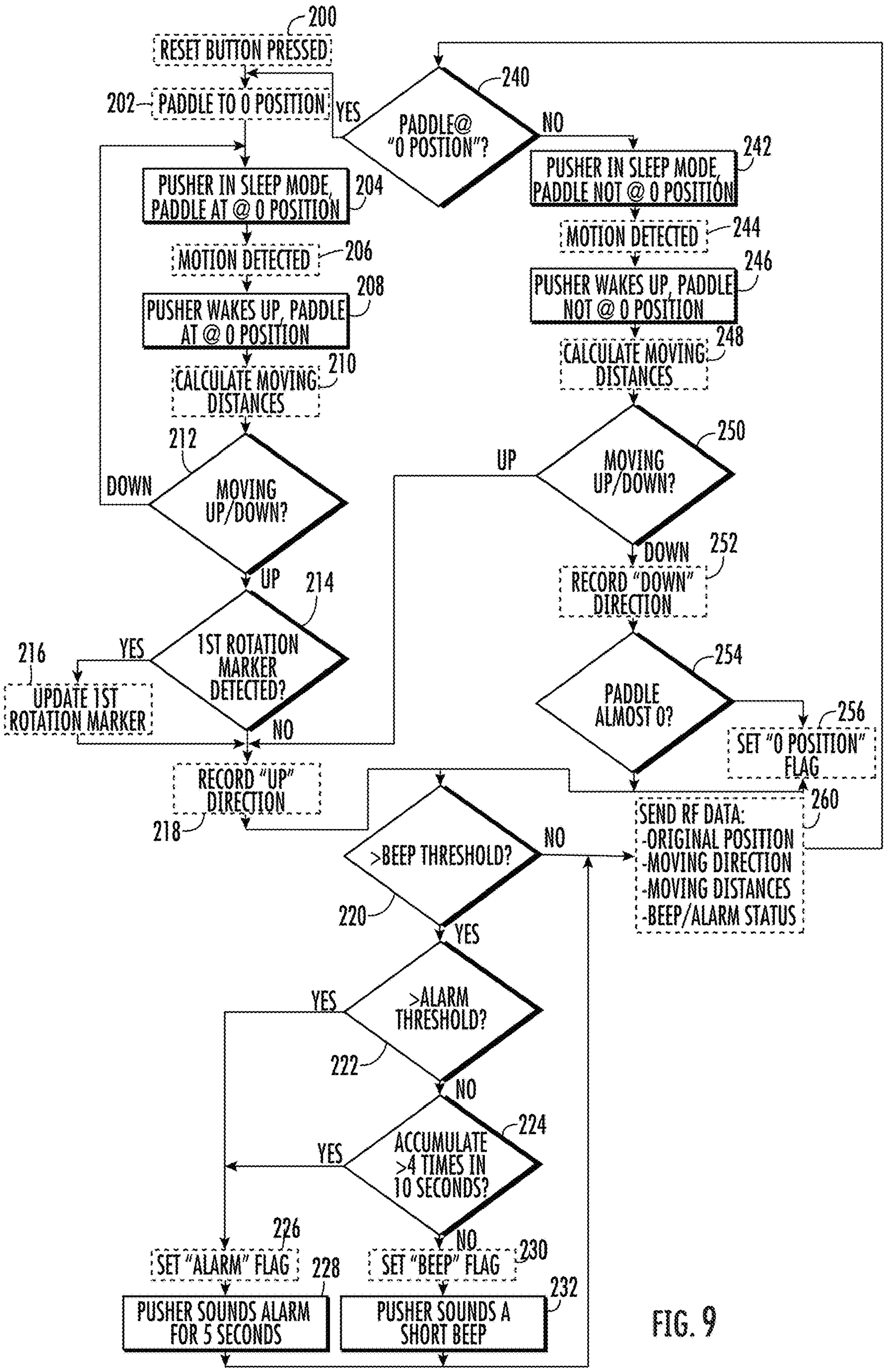
FIG. 9 is a flowchart of the motion detection and alarm functionality of the pusher, according to an embodiment of the invention.

Turning now to FIG. 9, the same illustrates the basic control logic of each pusher assembly 22. Starting at step 200, each pusher 26 must be "zeroed" by activating its reset control, such as a switch, dial, or button, when no product 42 is loaded therein, i.e., when coil spring 80 has drawn pusher 26 as close as is possible to the front of shelf 24. This is recorded at step 202 as the zero position. Thereafter, pusher 26 remains in sleep mode at step 204 until motion is detected at 206. Upon this detection, pusher 26 exits sleeps mode and monitors and calculates the distance it has moved at step 210 using the sensor arrangement described above.

At step 212 a determination is also made as to whether pusher 26 is moving up (i.e., toward the front of shelf 24) or down (i.e., toward the rear of shelf 24). If moving down, the process loops back to step 204. If moving up, the process continues to step 214 where a determination of whether the first rotation marker (i.e., a contact of contacts 134, 136) has been detected. If yes, this information is updated at step 216. After step 216, or if no contact of contacts 134, 136 is detected, the process moves on to step 218 and records the distance moved forward. This distance is then analyzed at step 220 to see if it is greater than a first threshold, i.e., a "beep" threshold where only a temporary alarm is generated. If it is not greater than this threshold, at step 260 transmitter 72 then sends RF data corresponding to the original position of pusher 26, the distance pusher 26 moved, the direction pusher 26 moved, and an alarm status.

If, however, at step 220 the distance moved is such that the temporary alarm should be generated, at check is performed at step 222 to confirm whether or not the distance moved is great enough to warrant a full alarm. If yes, at step 226 the alarm status is saved and an alarm of five seconds in duration is generated at step 228. If, at step 222 it is determined that the alarm threshold has not been met, then an additional check at step 224 is performed to determine whether the threshold at step 220 has been exceeded within a time period of ten seconds. If no, the temporary alarm status is saved at step 230 and only the temporary alarm is generated at step 232. At the end of either of steps 228 or 232, RF information is sent at step 260.

If the check at step 220 is no, or if either of steps 228 or 232 are completed, the process then proceeds to step 240, to determine whether the pusher is at its previously-set zero position. If yes, then the foregoing steps are repeated as necessary upon movement of pusher 26. If not, the process moves onto step 242 where pusher 26 returns to sleep mode. Pusher 26 exits sleep mode at step 246 and monitors and calculates the distance it has moved at step 248. A determination at step 250 is conducted to determine whether the pusher has moved up or down in the same manner as described above relative to step 212. If moving up, the process proceeds to step 218 and continues as described above. If moving down, this distance is recorded at step 252. A determination is then made at step 254 as to whether pusher 26 has returned to its zero position. If so, it is recorded at step 256 that the pusher is at its zero position, and the process continues to step 220. If not, nothing is recorded, and the process continues to step 220.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A retail merchandise pusher configured for sliding along a track of a pusher assembly, the pusher assembly mountable to a retail merchandise shelf, the pusher comprising:

a housing;

a spring drum rotatably mounted within the housing;

a coil spring mounted to the spring drum, the coil spring coilable and uncoilable upon rotation of the spring drum; and a controller coupled to a sensor arrangement carried, the sensor arrangement disposed within the housing, the sensor arrangement comprising:

a spring drum sensor for detecting rotation of the spring drum;

a direction sensor for detecting a direction of rotation of the spring drum; and an incremental distance sensor for detecting an incremental movement of the pusher;

wherein the controller is configured to calculate, based on data from the sensor arrangement, a total distance and direction of travel by the pusher, and to generate an alarm when the pusher travels more than a threshold distance within a predetermined period of time; and a reset control disposed within the housing and operable to set a zero position for the controller, wherein the reset control is a button or a switch, and the zero position indicating that no merchandise is contained in the pusher assembly.

2. The retail merchandise pusher of claim 1, wherein the alarm is at least one of a visual, audible, or a radio frequency (RF) signal.

3. The retail merchandise pusher of claim 2, wherein the controller is coupled to an output device disposed in the housing, the output device configured to produce the alarm as a visual or audible signal.

4. The retail merchandise pusher of claim 1, wherein the controller is coupled to a transmitter disposed in the housing, the transmitter configured to wirelessly transmit data to a remote receiver, the data including at least one of an alarm status, and the total distance and direction of travel by the pusher.

5. The retail merchandise pusher of claim 4, wherein the controller is configured to transmit information, based on data from the sensor arrangement, wherein the information includes an inventory status for the pusher assembly.

6. The retail merchandise pusher of claim 1, wherein the controller comprises a microprocessor.

7. The retail merchandise pusher of claim 1, wherein the coil spring is configured to bias the housing toward one end of the track.

8. The retail merchandise pusher of claim 1, wherein the pusher is configured to permit a user to set or adjust at least one of the threshold distance and the predetermined period of time.

9. A pusher assembly configured for mounting to a retail shelf, the shelf having a front and a back, wherein retail merchandise situated near the front of the shelf is removable from the pusher assembly, the pusher assembly comprising:

a track;

a pusher mounted to the track, the pusher slidable toward and away from the front of the shelf, the pusher having a reset control disposed within a housing of the pusher and operable to set a zero position for the controller, wherein the reset control is a button or a switch, and the zero position indicating that no merchandise is contained in the pusher assembly, the pusher further comprising a controller coupled to a sensor arrangement for detecting movement and a direction of travel by the pusher, the controller configured to calculate, based on data from the sensor arrangement, a total distance traveled by the pusher along the track, the controller further configured to generate an alarm when the pusher travels more than a threshold distance within a predetermined period of time.

10. The pusher assembly of claim 9, wherein the sensor arrangement includes a spring drum sensor, a direction sensor, and an incremental distance sensor.

11. The pusher assembly of claim 9, wherein the alarm is at least one of a visual, audible, or a radio frequency (RF) signal, and the controller is coupled to a transmitter configured to wirelessly transmit data to a remote receiver, the data including at least one of an alarm status, and the total distance and direction of travel by the pusher.

12. The pusher assembly of claim 9, wherein the pusher is configured to permit a user to set or adjust at least one of the threshold distance and the predetermined period of time.

13. The pusher assembly of claim 9, wherein the controller is configured to provide, based on data from the sensor arrangement, an inventory status of the pusher assembly.

14. A retail merchandise display system for self- facing retail merchandise, the retail merchandise display comprising:

a shelf;

at least one pusher assembly mounted to the shelf, the at least one pusher assembly comprising:

a track;

a pusher slidable along the track, the pusher assembly comprising a controller coupled to a sensor arrangement, the controller configured to calculate, based on data from the sensor arrangement, a large- scale movement of the pusher, and an incremental movement by the pusher, wherein the controller is configured to generate a local alarm when a total distance traveled by the pusher, the total distance being equal to a sum of the large-scale movement and the incremental movement, is greater or equal to a predefined distance; and the pusher including a transmitter operable to wirelessly communicate the total distance traveled by the pusher, the pusher further including a reset control disposed within a housing of the pusher and operable to set a zero position for the controller, wherein the reset control is a button or a switch, and the zero position indicating that no merchandise is contained in the pusher assembly; and a receiver, remotely located from the pusher, is configured to receive a wireless signal from the transmitter, and configured to generate a remote alarm in concert with the local alarm.

15. The retail merchandise display system of claim 14, wherein the local and remote alarms are at least one of visual or audible alarms.

16. The retail merchandise display system of claim 14, wherein the at least one pusher assembly includes a plurality of pusher assemblies, wherein each one of the plurality of pusher assemblies wirelessly communicate with the receiver.

17. The retail merchandise display system of claim 14, wherein the receiver includes a radio frequency (RF) receiver, an audio speaker, and a Wi-Fi module configured to transmit data received from the pusher.

18. The retail merchandise system of claim 14, wherein the wireless signal is a radio frequency (RF) signal.

19. The retail merchandise display system of claim 14, wherein the receiver is configured to transmit data received from the pusher to a computer or mobile device, wherein the data allows the computer or mobile device to display information regarding the pusher assembly.

20. The retail merchandise display system of claim 19, wherein the information regarding the pusher assembly includes at least one of an alarm status, and inventory status, and a position of the pusher.

* * * * *